ated May 2, 1972

3,660,435
3,16α,17α-TRIHYDROXY-Δ¹,³,⁵⁽¹⁰⁾-OESTRATRIENE

Georg Anner and Jaroslav Kalvoda, Basel, Switzerland, assignors to Ciba Corporation, Summit, N.J.
No Drawing. Filed Feb. 11, 1970, Ser. No. 10,648
Claims priority, application Switzerland, Feb. 27, 1969, 2,962/69
Int. Cl. C07c $169/20$
U.S. Cl. 260—397.5                           1 Claim

ABSTRACT OF THE DISCLOSURE

The compound of the formula

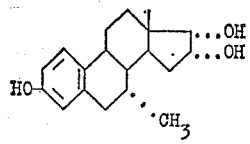

Use: As oestrogenic agent or as agent for the inhibition of the gonadotropic function and ovulation or generally for controlling fertility.

SUMMARY OF THE INVENTION

The above 7α - methyl - 3,16α,17α - trihydroxy-Δ¹,³,⁵⁽¹⁰⁾-oestratriene possesses valuable pharmocological properties. Thus it above all exerts an oestrogenic, antigonadotropic, ovulation-inhibiting and/or blastocyte-implantation-inhibiting effect. Thus it for example shows an oestrogenic effect in the Allen-Doisy test on female rats with doses of 0.001 to 0.01 mg./kg. s.c. and of 0.02 to 0.3 mg./kg. p.o., and in the Buelbring-Burn test on female rats with doses of 0.0003 to 0.003 mg./kg. s.c. and of 0.003 to 0.03 mg./kg. p.o. Furthermore, the antigonadotropic activity can be demonstrated in the known parabiosis test with doses of 0.0003 to 0.003 mg./kg. s.c. or 0.004 to 0.3 mg./kg. p.o. in rats. The ovulation-inhibiting activity already shows itself with doses of 0.0001 to 0.001 mg./kg. s.c. or 0.003 to 0.01 mg./kg. p.o. administered to normal female rats. The blastocyte-implantation-inhibiting activity can be demonstrated with 0.003 to 0.03 mg./kg. s.c. or 0.03 to 0.1 mg./kg. p.o. on normal rats after copulation. The compound can thus be used as an oestrogenic agent and for inhibiting the gonadotropic function and ovulation, as well as generally for controlling the fertility.

The new compound can be obtained if a compound of formula

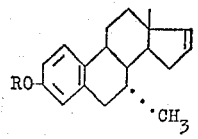

(II)

wherein RO represents a free, esterified or etherified hydroxyl group, is treated with osmium tetroxide and the resulting osmiate is split by reduction, or if a compound of formula

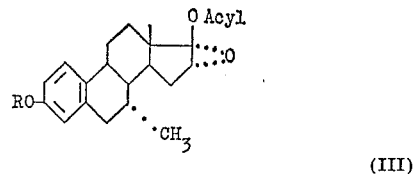

(III)

wherein RO has the above-mentioned significance and the acyl residue represents the residue of a carboxylic acid, especially a lower aliphatic carboxylic acid such as acetic acid, is reduced with a di-light metal hydride and the 16α,17α-dihydroxy compound is isolated from the reaction mixture and, if the hydroxyl group in the 3-position in the resulting compound is etherified or esterified, this group is split to give the free hydroxyl group.

The reaction of the Δ¹⁶-compound (Formula II) with osmium tetroxide and the reductive splitting of the osmiate, for example with an aqueous solution of mannitol or sodium bisulphite, or with lithium aluminium hydride, takes place in a manner which is in itself known. The same is true of the reductive opening of the 16,17-epoxy ring. Lithium aluminium hydride or sodium borohydride is preferably used as the di-light metal hydride; herein, the 16α,17β-dihydroxy compound is also obtained, alongside the desired 16α,17α-product. The former can be easily separated from the reaction mixture, for example by fractional crystallization or chromatography.

The starting substances used for this process are known or can be manufactured according to methods which are in themselves known. Thus the 16,17 - epoxy-17-acyloxy compound can be obtained by conversion of the known 7α-methyloestrone into its 17-enol-acylate and reaction with a per-acid such as meta-chloroperbenzoic acid, per-benzoic acid or perphthalic acid. If on the other hand the 17-enol-acylate is treated, for example with bromine, the resulting 16α - bromo-17-ketone is reduced, for example with sodium borohydride, and hypobromous acid is thereafter split off, then the Δ¹⁶-starting compound is obtained.

The new compound can be used as a medicine in the form of pharmaceutical preparations which contain this compound together with pharmaceutical organic or inorganic solid or liquid excipients which are suitable for enteral, for example oral, or parenteral administration. Possible substances for forming these preparations are substances which do not react with the new compound such as for example water, gelatine, lactose, starch, magnesium stearate, talc, vegetable oils, benzyl alcohols, gum, polyalkylene glycols, cholesterol or other known medicinal excipients. The pharmaceutical preparations may for example be in the form of tablets, dragées or capsules or in a liquid form as solutions, suspensions or emulsions. They are optionally sterilized and/or contain auxiliary substances such as preservatives, stabilisers, wetting agents or emulsifiers, salts for regulating the osmotic pressure or buffers. They may also contain further therapeutically valuable substances.

The invention is described in more detail in the examples which follow.

Example 1

9.3 g. of 3 - acetoxy - 7α - methyl - Δ¹,³,⁵⁽¹⁰⁾,¹⁶-oestratetraene are dissolved in 930 ml. of absolute ether and 9.7 ml. of pyridine and mixed at room temperature with 8.0 g. of osmium tetroxide in 110 ml. of absolute ether and left to stand for 3 days at room temperature with exclusion of light. The osmium ester is filtered off, rinsed with ether and boiled with 830 ml. of 95% strength ethyl alcohol and 830 ml. of 5% strength sodium hydrogen sulphite solution for 2 hours under reflux. After cooling to room temperature the osmium is separated off through Celite, and the filtrate is concentrated in a waterpump vacuum, mixed with water and the mixture twice extracted with chloroform. The chloroform solution is washed with water, dried over sodium sulphate and evaporated to dryness under a waterpump vacuum. The resulting foam is dissolved in 220 ml. of methyl alcohol, 4.8 g. of potassium carbonate in 55 ml. of water are added and the mixture is stirred for 45 minutes at 60° C. under nitrogen. After cooling, pouring onto an ice-water mixture and acidifying with dilute hydrochloric acid, the resulting product is filtered off, rinsed with water, and the residue taken up in methylene chloride/methyl alcohol, the solution dried with sodium sulphate and the product crystallised from ether. The 7α - methyl - 3,16α, 17α - trihydroxy - Δ$^{1,3,5(10)}$-oestratriene (7α - methyl-17-epi-oestriol) melts at 214–215° C.; $[α]_D^{20°} = +42°±1°$ (c.=0.973 in ethanol).

The starting material used in this example can for example be obtained as follows:

About 100 ml. are distilled at normal pressure from a solution of 30 g. of 7α-methyl-oestrone, 300 ml. of isopropenyl acetate and 18.2 ml. of a solution of 40 ml. of isopropenyl acetate and 1.3 ml. of concentrated sulphuric acid. After further addition of 300 ml. of isopropenyl acetate and 19.2 ml. of a solution of 40 ml. of isopropenyl acetate and 1.3 ml. of concentrated sulphuric acid about 400 ml. are distilled off in the course of a further 3 hours at normal pressure, whereupon, after cooling to 5° C., a solution of 42 ml. of pyridine in 300 ml. of ether is added. After dilution with ice and water the dark mixture is twice extracted with an ether-methylene chloride mixture (4:1), and the organic constituents are washed with water, ice-cold dilute sulphuric acid, water, saturated sodium hydrogen carbonate solution and again with water until neutral. The solution is dried over sodium sulphate and evaporated to dryness under a waterpump vacuum. The resulting brown foam is chromatographed on a 50-fold quantity of silica gel. Elution with a toluene-ethyl acetate mixture (95:5) yields crude 3,17-diacetoxy - 7α - methyl - Δ$^{1,3,5(10),16}$-oestratetraene, which after one recrystallization from ether/petroleum ether melts at 110–111° C.; $[α]_D^{20} = +77°±2°$ (c.=0.639).

2.5 g. of potassium carbonate are added to a solution of 25 g. of this compound in 900 ml. of carbon tetrachloride, 134 ml. of a 1.13 N bromine solution in carbon tetrachloride are added in the course of 5 minutes at 0° C., and the mixture is thereafter stirred for 5 minutes whilst cooling in ice. It is poured on to an ice-water mixture, twice extracted with an ether-methylene chloride mixture (4:1), and the organic phase is washed with sodium thiosulphate solution, water, saturated ice-cooled sodium hydrogen carbonate solution and again with water until neutral, dried over sodium sulphate and evaporated to dryness in a waterpump vacuum at about 40° C.

600 ml. of methanol are slowly added to a solution of about 28 g. of the resulting bromoketone in 300 ml. of tetrahydrofuran whilst stirring, and the mixture is treated with 6.58 g. of sodium borohydride and stirred for 2 hours at room temperature under nitrogen. 30 ml. of 99–100% strength acetic acid are added and the mixture is poured on to ice and water and twice extracted with ether/methylene chloride. The organic phases are washed with water, saturated sodium hydrogen carbonate solution and again with water until neutral, dried over sodium sulphate and evaporated to dryness under a waterpump vacuum at about 40° C. The resulting bromohydrin is dissolved in 100 ml. of 95% strength alcohol, 100 g. of zinc dust are added and the mixture is boiled for 5 hours under a reflux condenser. After cooling the mixture is filtered, the residue is washed with ethanol and methylene chloride, and the evaporated filtrate is twice extracted with ether/methylene chloride after addition of water. The extract is washed with water, saturated sodium hydrogen carbonate solution and water, dried over sodium sulphate and evaporated in a waterpump vacuum. The residue is dissolved in 100 ml. of pyridine and 100 ml. of acetic anhydride and boiled for 5½ hours under a reflux condenser. The usual working-up yields a red foam which is chromatographed on a 50-fold amount of silica gel. Elution with toluene yields 3-acetoxy-7α-methyl-Δ$^{1,3,5(10),16}$-oestratetraene as a colorless oil; $[α]_D^{20} = +84°±2°$ (c.=0.508).

Example 2

A solution of 7.14 g. of 3,17β - diacetoxy - 7α - methyl-16α,17α - oxido - Δ$^{1,3,5(10)}$-oestratriene in 285 ml. of tetrahydrofuran is added to a suspension of 2.85 g. of lithium aluminium hydride in 285 ml. of tetrahydrofuran at about 10–15° C. and after rinsing down with 140 ml. of tetrahydrofuran the mixture is boiled for 2 hours under a reflux condenser. 30 ml. of ethyl acetate are cautiously added at about 10° C., followed by 550 ml. of 2 N hydrochloric acid and then by 1 liter of chloroform, the mixture is stirred for 10 minutes at room temperature and the organic layer separated off. The extract is washed with water, dried over sodium sulphate and evaporated to dryness in a waterpump vacuum. After adsorption of the resulting foam on a 50-fold amount of silica gel and elution with a mixture of toluene and ethyl acetate (7:3) 7α - methyl - 3,16α,17α - trihydroxy-Δ$^{1,3,5(10)}$-oestratriene is obtained, which after recrystallization from methylene chloride-methanol-ether melts at 214–215° C.

The starting material used in this example can for example be obtained as follows:

2.3 g. of approximately 88% strength m-chloroperbenzoic acid are added at about 18° C. to a solution of 3.38 g. of the 3,17 - diacetoxy - 7α - methyl - Δ$^{1,3,5(10),16}$-oestratetraene described in Example 1 in 70 ml. of methylene chloride, and the mixture is stirred for 30 minutes at room temperature. The reaction solution is diluted with ether, washed with potassium iodide solution, sodium thiosulphate solution, water, saturated sodium hydrogen carbonate solution and again with water until neutral, the wash waters are re-extracted with ether and the combined organic phases are dried over sodium sulphate. After evaporation and recrystallization of the residue from methylene chloride/ether/petroleum ether 3,17β - diacetoxy - 7α - methyl - 16α,17α - oxido-Δ$^{1,3,5(10)}$-oestratriene of melting point 156–157° C. is obtained. $[α]_D^{20°} = +51°±2°$ (c.=0.635.).

What is claimed is:

1. 7α - methyl - 3,16α,17α - trihydroxy - Δ$^{1,3,5(10)}$-oestratriene of the formula

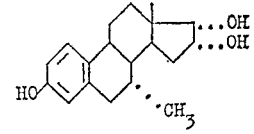

References Cited

UNITED STATES PATENTS 3,558,776   1/1971   Campbell et al. _____ 424—243

OTHER REFERENCES

"Steroids" by Fieser et al. (1959). Copyright by Reinhold Publishing Corp., p. 159 relied on.

ELBERT L. ROBERTS, Primary Examiner

U.S. Cl. X.R.

260—239.55